(12) United States Patent
Kim et al.

(10) Patent No.: US 8,994,902 B2
(45) Date of Patent: Mar. 31, 2015

(54) TRANSPARENT DISPLAY DEVICE AND MANUFACTURING METHOD THEREOF

(75) Inventors: Sang-Il Kim, Yongin-si (KR); Nam-Seok Roh, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 316 days.

(21) Appl. No.: 12/407,225

(22) Filed: Mar. 19, 2009

(65) Prior Publication Data

US 2010/0002175 A1    Jan. 7, 2010

(30) Foreign Application Priority Data

Jul. 2, 2008    (KR) .................. 10-2008-0064129

(51) Int. Cl.
| | |
|---|---|
| *G02F 1/1335* | (2006.01) |
| *G02F 1/1347* | (2006.01) |
| *C09K 19/02* | (2006.01) |
| *G02F 1/137* | (2006.01) |

(52) U.S. Cl.
CPC ........ *G02F 1/13718* (2013.01); *G02F 2201/44* (2013.01); *G02F 2203/62* (2013.01)
USPC .............................. 349/115; 349/74; 349/175

(58) Field of Classification Search
CPC ............ G02F 1/1347; G02F 1/133514; G02F 1/133533
USPC ............................................ 349/74, 115, 175
See application file for complete search history.

(56) References Cited

U.S. PATENT DOCUMENTS

| | | | | |
|---|---|---|---|---|
| 5,801,796 | A * | 9/1998 | Lowe ............................... | 349/73 |
| 6,798,472 | B2 * | 9/2004 | Nagae ........................... | 349/106 |
| 7,821,597 | B2 * | 10/2010 | Doe ................................ | 349/69 |
| 2005/0099559 | A1 | 5/2005 | Lee et al. | |
| 2006/0066803 | A1 * | 3/2006 | Aylward et al. ............... | 349/158 |
| 2008/0211734 | A1 * | 9/2008 | Huitema et al. .............. | 345/3.1 |

FOREIGN PATENT DOCUMENTS

| | | |
|---|---|---|
| JP | 2001312233 | 11/2001 |
| JP | 2005107445 | 4/2005 |
| JP | 2006285250 | 10/2006 |
| JP | 2007155784 | 6/2007 |
| JP | 2007156256 | 6/2007 |
| JP | 2007-178733 | 7/2007 |
| KR | 1020010028910 A | 4/2001 |
| KR | 1020060018209 A | 2/2006 |
| KR | 1020060107756 A | 10/2006 |
| KR | 1020070066488 | 6/2007 |
| KR | 1020080017012 | 2/2008 |

\* cited by examiner

*Primary Examiner* — Charles Chang
(74) *Attorney, Agent, or Firm* — Cantor Colburn LLP (57) ABSTRACT

A display device includes; a first substrate, a second substrate disposed substantially opposite to the first substrate, a third substrate disposed between the first substrate and the second substrate, a color display layer disposed between the first substrate and the third substrate, the color display layer comprising a cholesteric liquid crystal, a first electrode and a second electrode electrically connected to the color display layer, a color conversion layer disposed between the third substrate and the second substrate, and a third electrode and a fourth electrode electrically connected to the color conversion layer.

22 Claims, 11 Drawing Sheets

TRANSPARENT DISPLAY DEVICE AND MANUFACTURING METHOD THEREOF

This application claims priority to Korean Patent Application No. 10-2008-0064129, filed on Jul. 2, 2008, and all the benefits accruing therefrom under 35 U.S.C. §119, the contents of which in its entirety are herein incorporated by reference.

BACKGROUND OF THE INVENTION (a) Field of the Invention

The present invention relates to a display device and a manufacturing method thereof. In detail, the present invention relates to a display device that both reflects and transmits light and a manufacturing method thereof.

(b) Description of the Related Art

Recently, the display device market has changed through the introduction of flat panel displays ("FPDs") that easily realize a large, thin and light screen. The flat panel displays that are commercially available include a liquid crystal display ("LCD"), and a plasma display panel ("PDP").

On the other hand, the commercial availability of other display devices has developed other than the LCD and the PDP. Particularly, a transparent display device that transmits light as well as having the general display functions of a display device has gained attention as a new type of display device.

However, because the transparent display device must show objects disposed on the rear side thereof by transmitting light while outputting full colors by reflecting various wavelength, implementation thereof is difficult.

BRIEF SUMMARY OF THE INVENTION

An exemplary embodiment of a display device according to the present invention includes; a first substrate, a second substrate disposed substantially opposite to the first substrate, a third substrate disposed between the first substrate and the second substrate, a color display layer formed between the first substrate and the third substrate, and including a cholesteric liquid crystal, a first electrode and a second electrode electrically connected to the color display layer, a color conversion layer formed between the third substrate and the second substrate, and a third electrode and a fourth electrode electrically connected to the color conversion layer.

In one exemplary embodiment, the thickness of the third substrate may be equal to or less than about 20% of the width of the color display layer or the color conversion layer of one pixel.

In one exemplary embodiment, a first thin film transistor ("TFT") formed on the first substrate, wherein the first TFT is electrically connected to the second electrode, may be further included.

In one exemplary embodiment, the third electrode and the fourth electrode may have a stripe shape and may be disposed substantially perpendicularly to each other.

In one exemplary embodiment, a second TFT disposed on the second substrate or the third substrate, wherein the second TFT is electrically connected to the fourth electrode, may be further included.

In one exemplary embodiment, the third electrode and the fourth electrode may have a stripe shape and may be disposed substantially perpendicularly to each other.

In one exemplary embodiment, the cholesteric liquid crystal may be divided into a plurality of cells, and the cells may respectively display one color selected from the group consisting of red, green, blue, yellow, magenta, cyan, and white.

In one exemplary embodiment, the color conversion layer may be divided into a plurality of cells, and the cells respectively represent one selected from the group consisting of an opaque black, a transparent non-chroma state, and a semi-transparent ash color.

In one exemplary embodiment, the color conversion layer may include one of an electrochromic organic material, an electrochromic inorganic material, and a reverse emulsion based on an electrophoretic display.

In one exemplary embodiment, the color conversion layer may include a cell which displays an ash color gradation.

An exemplary embodiment of a method for manufacturing an exemplary embodiment of a display device according to the present invention includes; disposing a first thin film element structure including a second electrode on a first substrate, and a color display layer including a cholesteric liquid crystal on the first thin film element structure, disposing a first electrode under a third substrate, a second thin film element structure including a fourth electrode on the third substrate, and a color conversion layer on the second thin film element structure; disposing a third electrode under a second substrate, combining the first substrate and the third substrate to contact the first electrode with the color display layer, and combining the third substrate and the second substrate to contact the third electrode with the color conversion layer.

In one exemplary embodiment, the forming of the color display layer may include forming a partition for defining a plurality of cells and filling a cholesteric liquid crystal in the cells.

In one exemplary embodiment, the forming of the color conversion layer includes forming a partition defining a plurality of cells, and filling one of an electrochromic organic material, an electrochromic inorganic material and a reverse emulsion based on an electrophoretic display in the cells.

An exemplary embodiment of a method for manufacturing an exemplary embodiment of a display device according to the present invention includes; disposing a first thin film element structure including a second electrode on a first substrate, disposing a first electrode under a third substrate, a color display layer including a cholesteric liquid crystal under the first electrode, and a second thin film element structure including a fourth electrode on the third substrate, disposing a third electrode under a second substrate, and a color conversion layer including one of an electrochromic organic material, an electrochromic inorganic material and a reverse emulsion based on an electrophoretic display under the third electrode, combining the first substrate and the third substrate to contact the second electrode with the color display layer, and combining the third substrate and the second substrate to contact the fourth electrode with the color conversion layer.

In one exemplary embodiment, the forming of the color display layer may include forming a partition for defining a plurality of cells, and filling a cholesteric liquid crystal in the cells.

In one exemplary embodiment, the forming of the color conversion layer may include forming a partition defining a plurality of cells, and filling one of an electrochromic organic material, an electrochromic inorganic material and a reverse emulsion based on an electrophoretic display in the cells.

An exemplary embodiment of a display device according to the present invention includes; a first substrate, a second substrate disposed substantially opposite to the first substrate, a third substrate disposed between the first substrate and the second substrate, a first electrode and a second electrode respectively formed on the third substrate and the first substrate, a color display layer disposed between the first substrate and the third substrate, and being controlled to be in one state selected from the group consisting of red, green, blue, yellow, magenta, cyan, white, and transparent by an electric field formed between the first electrode and the second electrode, a third electrode and a fourth electrode respectively disposed on the second substrate and the third substrate, and a color conversion layer disposed between the third substrate and the second substrate, the color conversion layer being controlled to convert into a transparent state or a black state by an electric field formed between the third electrode and the fourth electrode.

In an exemplary embodiment of a transparent display device and an exemplary embodiment of a manufacturing method thereof according to the present invention, an electrochromic display ("ECD") and a cholesteric liquid crystal display are deposited such that all colors are displayed, and simultaneously light is transmitted to thereby prevent a parallax.

DETAILED DESCRIPTION OF THE EMBODIMENTS

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings. Next, an exemplary embodiment of a transparent display device according to the present invention will be described with reference to FIG. 1 to FIG. 6.

Figure 1:
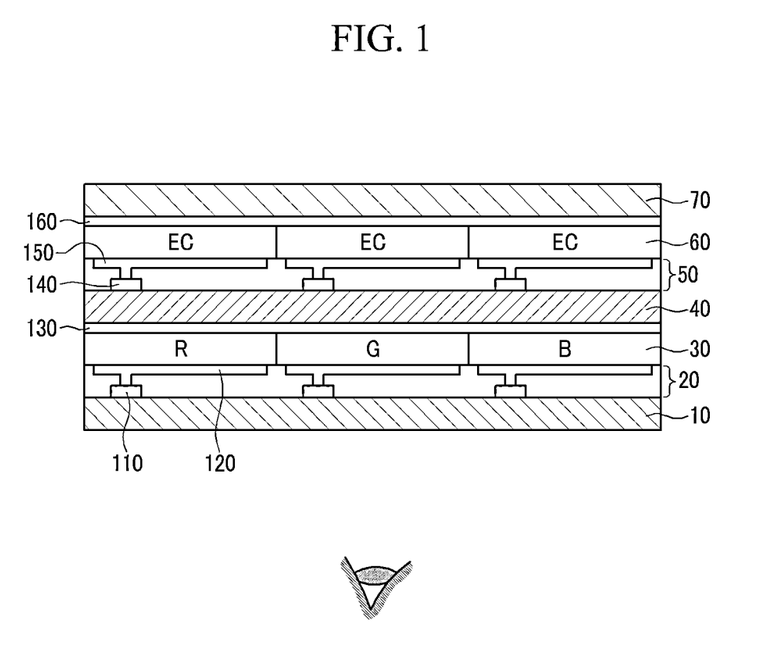
FIG. 1 is a cross-sectional view showing an exemplary embodiment of a transparent display device according to the present invention.

FIG. 1 is a cross-sectional view showing one exemplary embodiment of a transparent display device according to the present invention.

A first thin film element structure 20 is formed on a first substrate 10. Exemplary embodiments of the substrate 10 may include materials such as plastic or glass.

Here, the first thin film element structure 20 may include first thin film transistors 110 and second electrodes 120 (also referred to as "pixel electrodes") that are separately formed for every pixel.

A color display layer 30 including cholesteric liquid crystal is formed on the first thin film element structure 20. The cholesteric liquid crystal has a spiral structure in which molecules arranged in each layer are spirally twisted while forming a layered structure similar to a smectic liquid crystal such that it has a memory characteristic, a high contrast ratio, and a high resolution characteristic. The cholesteric liquid crystal has a planar state in which light of a specific wavelength is reflected, a focal conic state in which light is transmitted, or a middle state thereof, and a characteristic that the cholesteric liquid crystal maintains the specific state even if a voltage is not applied. Exemplary embodiments of the material comprising the cholesteric liquid crystal include a cholesterol derivative, and a composition in which an optical activated radical such as a 2-methyl-butyl group and a 2-methyl-butoxy group is added to the common nematic liquid crystal material.

The cholesteric liquid crystal in an exemplary embodiment of the present invention is divided into a plurality of cells, and the cells may respectively display a white color or one of a plurality of primary colors. Here, the color of the cells may be the same or different from adjacent cells. In one exemplary embodiment, the primary colors may be three primary colors of red, green, and blue, or three primary colors of yellow, magenta, and cyan, or various other color.

A third substrate 40, exemplary embodiments of which may comprise materials such as plastic or glass, is formed on the color display layer 30. In one exemplary embodiment, the thickness of the third substrate 40 may be equal to or less than about 20% of the width of the color display layer 30 or a color conversion layer 60 for one pixel. When the thickness of the third substrate 40 is increased to be more than about 20%, parallax may be generated such that display quality of the transparent display device may be deteriorated.

The color display layer 30 is applied with a voltage via a first electrode 130 and the second electrode 120. The first electrode 130 is formed on the color display layer 30, and the second electrode 120 is formed under the color display layer 30. Specifically, an electric field is formed in the color display layer 30 via voltages applied to the first and second electrodes 120 and 130, respectively.

In an exemplary embodiment of a transparent display device according to the present invention, the color display layer 30 is driven as an active matrix type of display. When driving as the active matrix type, to independently apply a voltage to each pixel, the first thin film element structure 20 includes a scanning signal line (not shown), a data image signal line (not shown), a switching element (e.g., the first TFTs 110), and the second electrode 120 independently formed in each pixel, and the first electrode 130 may comprise a transparent conductive material formed on substantially the entire surface of the third substrate 40. The switching element is disposed at an intersection point of the scanning signal line and the image data signal line, and is connected to the second electrode 120 that is independently formed in each pixel. The voltage applied to the second electrode 120 is independently controlled through the switching element. This active matrix type has merits such as a good contrast ratio and a high response speed. Alternative exemplary embodiments include configurations wherein the display may be driven as a passive matrix type of display as will be discussed in more detail below.

A second thin film element structure 50 is deposited on the third substrate 40. The constituent elements and the driving method of the second thin film element structure 50 are similar to those of the first thin film element structure 20. That is, when driving with the active matrix type, a switching element such as a second thin film transistor 140 and a fourth electrode 150 (also called a "pixel electrode") are formed in each pixel.

The color conversion layer 60, exemplary embodiments of which may include an electrochromic organic or inorganic material or a reverse emulsion based on an electrophoretic display, is deposited on the second thin film element structure 50.

In the exemplary embodiment wherein the color conversion layer 60 includes the electrochromic display, the color conversion layer 60 outputs a screen by using the phenomenon that a color of the electrochromic material is reversibly changed by an electric field direction when applying a voltage across the electrochromic material. The electrochromic material has the optical characteristic that is reversibly changed by an oxidation and reduction reaction. An electrochromic inorganic material such as $WO_3$, $MoO_3$, and $TiO_3$ has a cathodic coloration in which a color is represented in the reduction state and the color disappears in the oxidation state. An electrochromic inorganic material such as $V_2O_5$, $IrO_2$, $Nb_2O_5$, and NiO has an anodic coloration in which the color disappears in the reduction state and the color appears in the oxidation state. Also, electrochromic organic materials such as a viologen derivative exist.

In the exemplary embodiment wherein the color conversion layer 60 includes the electrophoretic display, the reverse emulsion based on an electrophoretic display may include a non-polar solvent, and a polar emulsion dispersed in the non-polar solvent. In such an exemplary embodiment the non-polar solvent may include a $C_{1-30}$ alkane, a $C_{2-30}$ alkene, a $C_{3-30}$ alkyne, a $C_{3-30}$ aldehyde, a $C_{3-30}$ ketone, a $C_{2-30}$ ether, a $C_{2-30}$ ester, a $C_{3-30}$ thioester, a terpene, a $C_{2-30}$ organosilane, or a $C_{2-30}$ organosiloxane, and combinations thereof. In addition, in such an exemplary embodiment the polar emulsion may include an alcohol, an amine, an amide, a ketone, a carboxylic acid, a carboxylic acid salt, a glycol, a polyether, a sulfide, a sulfonic acid, a sulfonic acid salt, a sulfate, a phosphide, a phosphite, a phosphonite, a phosphinite, a phosphate, a phosphonate, a phosphinate, an imide, a nitrile, an isonitrile, an amidine, a nitro compound, a nitroso compound, a sulfoxide, a sulfonate, a thiol, or water, and combinations thereof. Finally, in such an exemplary embodiment the polar emulsion may include dimethyl sulphoxide ("DMSO"), dimethyl formamide ("DMF"), an amide, methanol, ethanol, a glycol, nitromethane, acetonitrile, water, methoxyethanol, methyl Cellosolve, or monoethyl, and combinations thereof.

An exemplary embodiment of the color conversion layer 60 of the present invention includes a plurality of divided cells, and the cells are transparent in a non-chroma state, and are black-colored in an opaque state, or may display an ash color gradation between the non-chroma and the opaque states. Here, the color of the cells may be the same or different. For example, the material representing the black has transmittance of the color according to a degree of application of a voltage. That is, the material may be changed in color such as opaque black, the semi-transparent ash color, and the transparent non-chroma state. The electrochromic display or the electrophoretic display does not need a polarizer and in one exemplary embodiment, uses a material having a memory function.

The color conversion layer 60 receives the voltage by a third electrode 160 and the fourth electrode 150. Specifically, an electric field is formed in the color conversion layer 60 via voltages applied to the third and fourth electrodes 160 and 150, respectively. The third electrode 160 is formed under a second substrate 70 and is disposed on the color conversion layer 60, and the fourth electrode 150 is disposed under the color conversion layer 60. The color conversion layer 60 may be driven as the active matrix type like the color display layer 30.

Exemplary embodiments of the second substrate 70 may comprise plastic or glass and is formed on the third electrode 160 on the color conversion layer 60.

Alternative exemplary embodiments include configurations wherein the second thin film element structure 50 may be formed on the second substrate 70. In this case, the third electrode 160 is formed on the third substrate 40 and is disposed under the color conversion layer 60. Essentially, the structure of the second thin film element structure 50 and the third electrode 160 may be vertically reversed.

FIG. 2A to FIG. 2F are exemplary views showing the various outputs of an exemplary embodiment of a transparent display device according to the present invention. FIG. 3 shows a detailed example of a screen outputted through an exemplary embodiment of the transparent display device shown in FIG. 1.

Figure 2A:
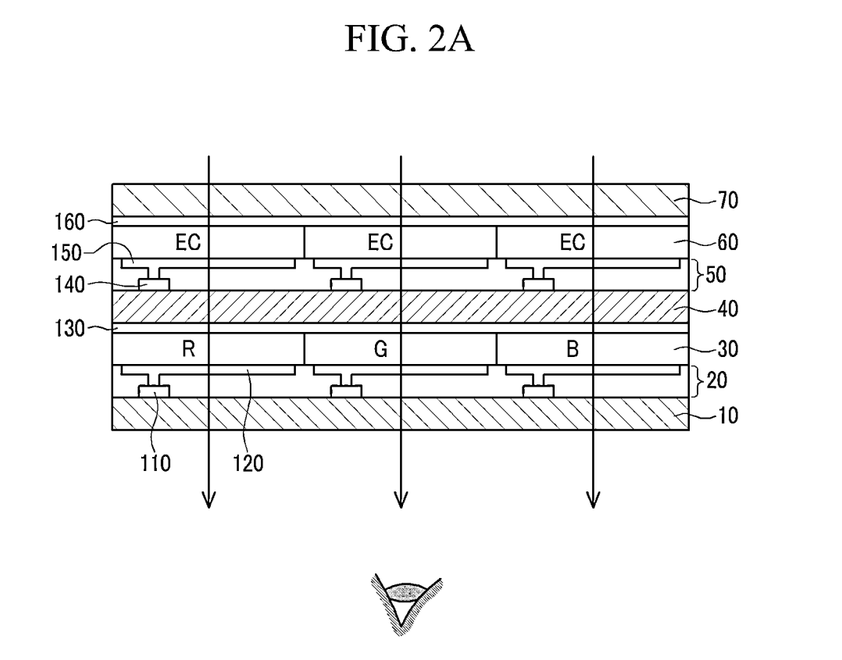
FIG. 2A is a cross-sectional view showing a configuration in which the exemplary embodiment of a transparent display device shown in FIG. 1 transmits all light.
Figure 3:
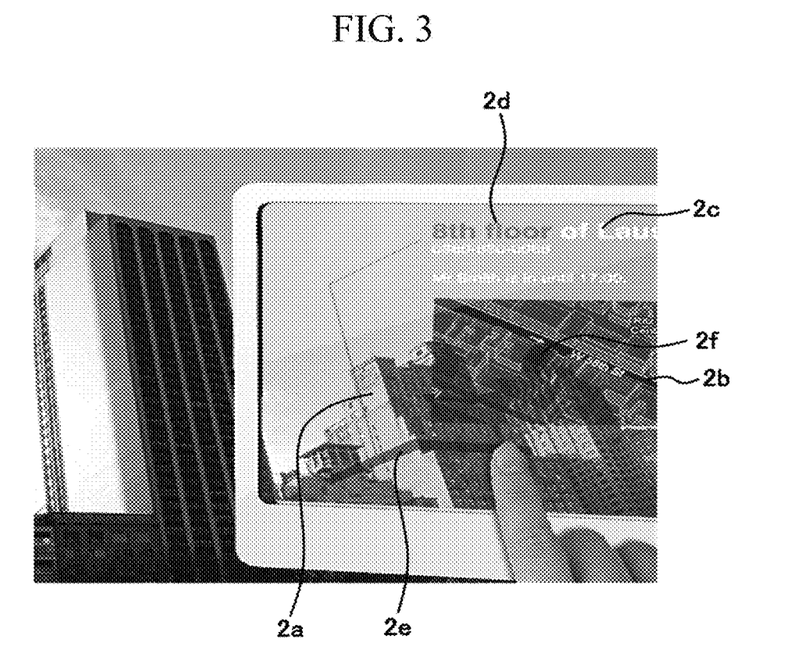
FIG. 3 shows a detailed example of a screen outputted through an exemplary embodiment of the transparent display device shown in FIG. 1.

FIG. 2A shows a configuration in which the exemplary embodiment of a transparent display device transmits substantially all the light incident upon the second substrate 70, that is, the transparent display device has a function like that of transparent glass, as shown in FIG. 3 where an object building disposed behind the transparent display device is shown through the transparent display device without obscuration or modification. Here, the color conversion layer 60 is in a non-chroma state in which the light is substantially entirely transmitted therethrough due to the application of a voltage thereto, and the color display layer 30 has the non-chroma state in which all cells are not applied with the voltage such that the light is substantially entirely transmitted therethrough, e.g., the color display layer 30 does not filter out any particular color.

Figure 2B:
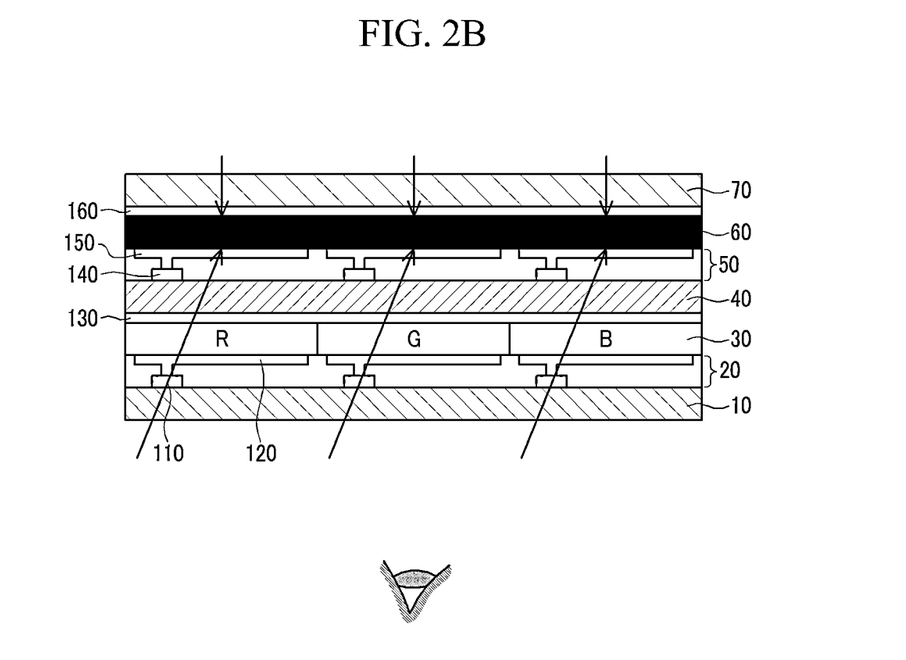
FIG. 2B is a cross-sectional view showing a configuration in which the exemplary embodiment of a transparent display device shown in FIG. 1 outputs a black color.

FIG. 2B is a view showing a configuration in which the exemplary embodiment of a transparent display device displays a black color, like the portion 2b of FIG. 3. Here, the color conversion layer 60 is in the black-colored opaque state such that the light is substantially entirely blocked thereby due to the application of the voltage such that the color conversion layer 60 is darkly shown, and the color display layer 30 has the non-chroma state in which all cells are not applied with the voltage such that the light is substantially entirely transmitted therethrough to be absorbed by the color conversion layer 60. Accordingly, as shown in FIG. 3, the black color of the color conversion layer 60 is shown through the screen in a state such that the object building disposed behind the transparent display device is not shown.

Figure 2C:
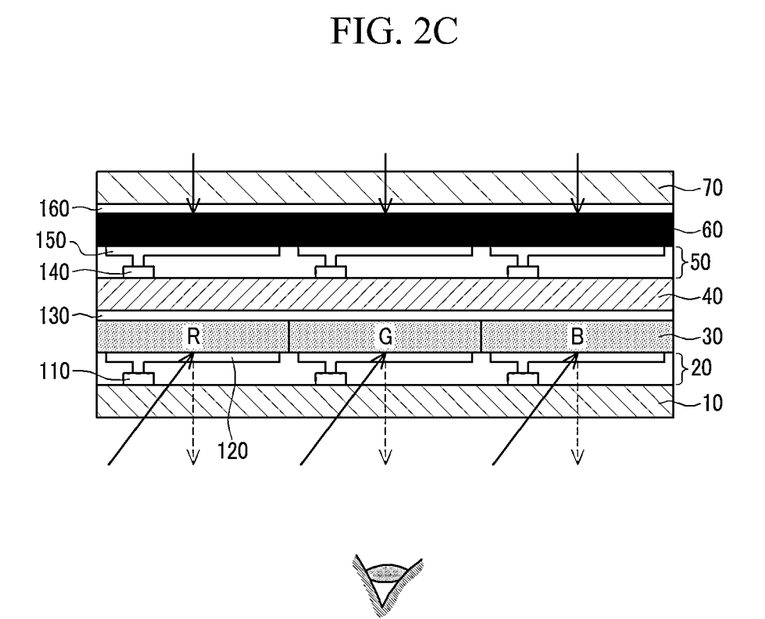
FIG. 2C is a cross-sectional view showing a configuration in which the exemplary embodiment of a transparent display device shown in FIG. 1 outputs a white color.

FIG. 2C is a view showing a configuration in which the exemplary embodiment of a transparent display device outputs a white color, like the portion 2c of FIG. 3 in which the transparent display device represents the character of the opaque color. Here, the color conversion layer 60 blocks substantially all light by the application of the voltage and is shown with the black state, and the voltage is applied to all cells in the color display layer 30 such that the pixels reflect the light of red, green, and blue and thereby the color display layer 30 represents white light in which the light of red, green, and blue is mixed. Accordingly, the object building disposed behind the transparent display device is not shown, and the text of an opaque white color is displayed.

Figure 2D:
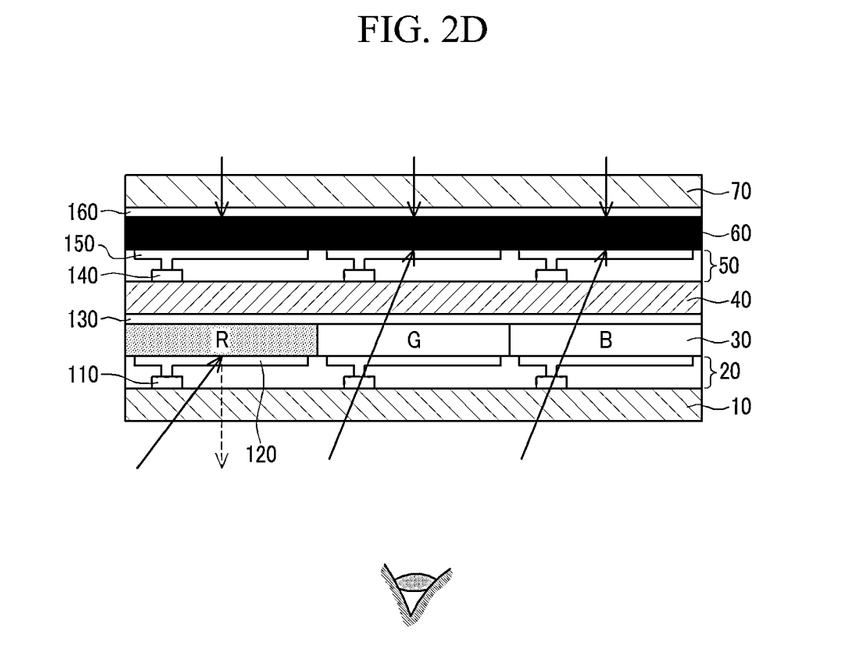
FIG. 2D is a cross-sectional view showing a configuration in which the exemplary embodiment of a transparent display device shown in FIG. 1 outputs a non-transparent red color.

FIG. 2D is a view showing a configuration in which the exemplary embodiment of a transparent display device outputs an opaque red color, like the portion 2d of FIG. 3 where the transparent display device represents the characters of the opaque red color. Here, the color conversion layer 60 blocks substantially all light by the application of the voltage and is shown with the black state, and the voltage is applied to the cells for displaying the red color such that the color display layer 30 represents the red color. Accordingly, the object building disposed behind the transparent display device is not shown, and the text of an opaque red color is displayed.

Figure 2E:
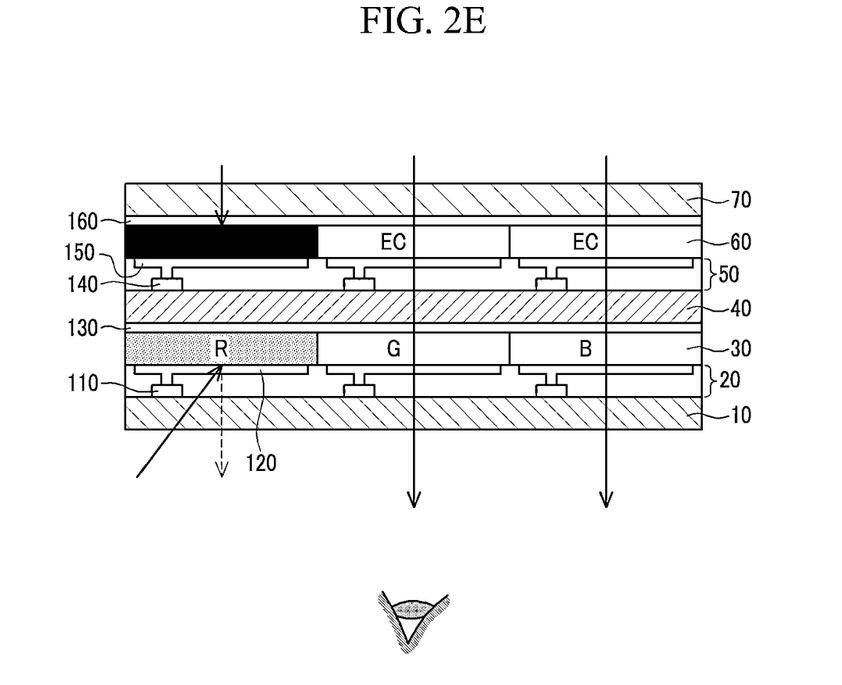
FIG. 2E is a cross-sectional view showing a configuration in which the exemplary embodiment of a transparent display device shown in FIG. 1 outputs a transparent red color.

FIG. 2E is a view showing a configuration in which the exemplary embodiment of a transparent display device outputs a transparent red color, like the portion 2e of FIG. 3 where the transparent display device represents the line that displays the specific layer with the transparent red color while showing the object through the transparent display device. Here, the voltage is applied to the cells for displaying the red color such that the color display layer 30 represents the red color. On the other hand, the cell of the color conversion layer 60 that corresponds to the cell that displays the red color of the color display layer 30 has the black color, and the cell of the color conversion layer 60 that corresponds to the object building has the non-chroma state. Accordingly, the line of the transparent red color is represented while the object building disposed behind the transparent display device is shown.

Figure 2F:
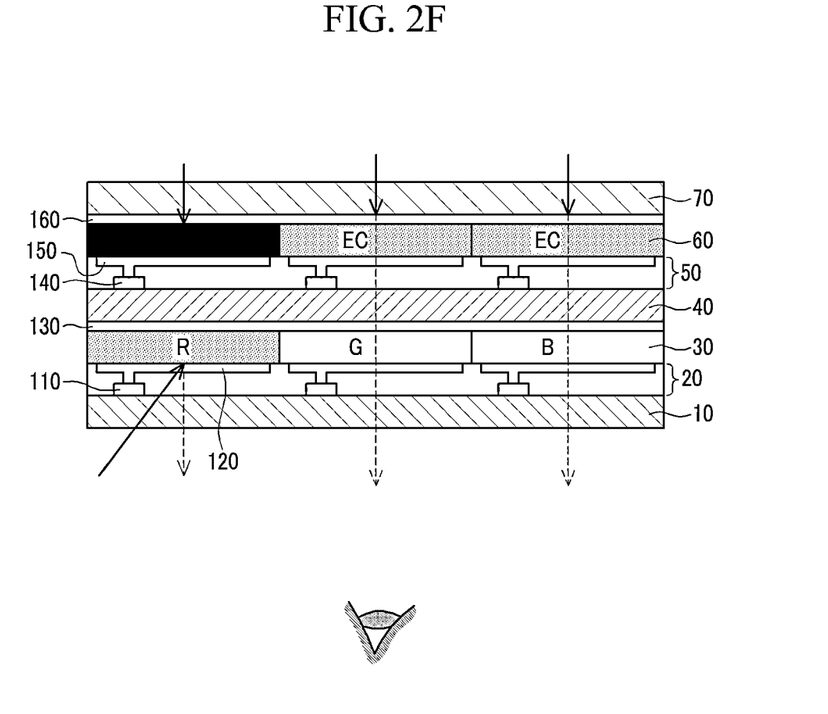
FIG. 2F is a cross-sectional view showing a configuration in which the exemplary embodiment of a transparent display device shown in FIG. 1 outputs a semi-transparent red color.

FIG. 2F is a view showing a configuration in which the exemplary embodiment of a transparent display device outputs a semi-transparent red color, like the portion 2f of FIG. 3 where the symbol of which the building is displayed on the transparent display device is output with the semi-transparent red color. Here, the voltage is applied to the cells for displaying the red color such that the color display layer 30 represents the red color. On the other hand, the cell of the color conversion layer 60 that corresponds to the cell that displays the red color of the color display layer 30 is the black color, and the cell of the color conversion layer 60 that does not correspond to the cell that displays the red color of the color display layer 30 is the semi-transparent ash color. Here, the brightness and the transparency of the ash color is controlled according to the magnitude of the voltage applied to the color conversion layer 60. Also, control of the gray of the ash color is possible. Accordingly, the red symbol of the building is displayed darker than the case of FIG. 2E while displaying the object building disposed behind the exemplary embodiment of a transparent display device.

Figure 4:
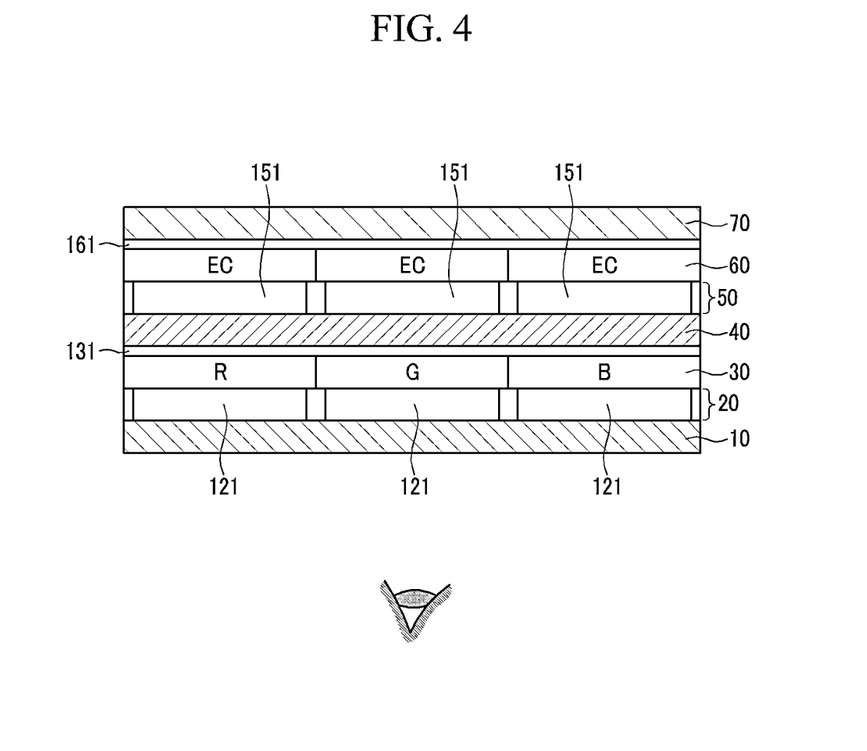
FIG. 4 is a cross-sectional view showing another exemplary embodiment of a transparent display device according to the present invention.

FIG. 4 is a cross-sectional view showing another exemplary embodiment of a transparent display device according to the present invention.

The exemplary embodiment of a transparent display device of FIG. 4 is similar to the exemplary embodiment of a transparent display device of FIG. 1 except for the fact that the color display layer 20 and the color conversion layer 60 are driven as a passive matrix type of display. The descriptions of FIG. 2A to FIG. 2F may also be applied to the transparent display device of FIG. 4. Furthermore, the screen of FIG. 3 may be displayed through the transparent display device shown in FIG. 4.

When driving the color display layer 20 as the passive matrix type, the first thin film element structure 20 includes a transparent second electrode 121 with a stripe shape, and a first electrode 131 formed on the third substrate 40 comprises a transparent conductive material with the stripe shape. The second electrode 121 and the first electrode 131 with the stripe shape are alternatively disposed, and a voltage is applied between the second electrode 121 and the first electrode 131 to supply the voltage to the pixel disposed at the intersection point thereof. This passive matrix type of display device may be manufactured with a low cost.

When driving the color conversion layer 60 as the passive matrix type of display, the second thin film element structure 50 includes a fourth electrode 151 as a transparent electrode with a stripe shape, and a third electrode 161 as the transparent electrode with a stripe shape is formed on the second substrate 70.

Figure 5:
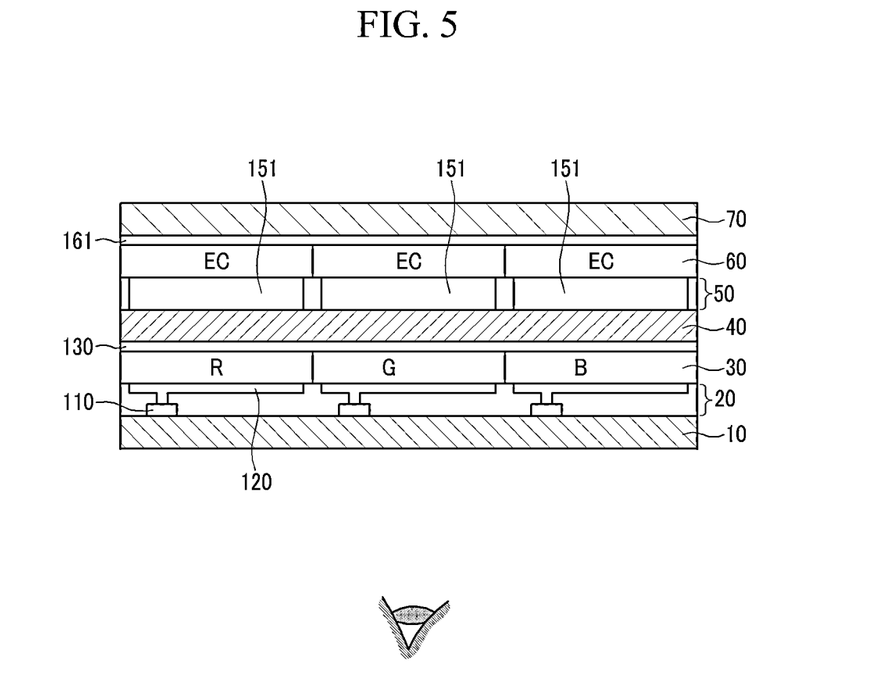
FIG. 5 is a cross-sectional view showing another exemplary embodiment of a transparent display device according to the present invention.

FIG. 5 is a cross-sectional view showing another exemplary embodiment of a transparent display device according to the present invention.

The exemplary embodiment of a transparent display device of FIG. 5 is similar to the exemplary embodiment of a transparent display device of FIG. 1 except for the fact that the color display layer 30 is driven as the active matrix type and the color conversion layer 60 is driven as the passive matrix type. The descriptions of FIG. 2A to FIG. 2F may also be applied to the transparent display device of FIG. 5. Furthermore, the screen of FIG. 3 may be displayed through the transparent display device shown in FIG. 5.

The first thin film element structure 20 includes the first thin film transistor 110 and the second electrode 120. Furthermore, the second thin film element structure 50 includes the fourth electrode 151 as the transparent electrode with the stripe shape, and the third electrode 161 as the transparent electrode with the stripe shape is formed on the second substrate 70.

Figure 6:
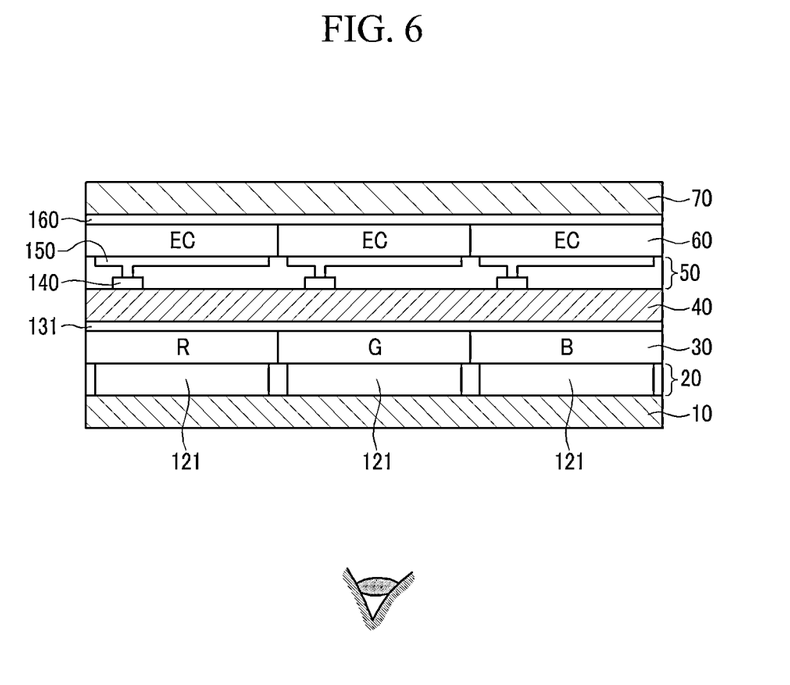
FIG. 6 is a cross-sectional view showing another exemplary embodiment of a transparent display device according to the present invention.

FIG. 6 is a cross-sectional view showing another exemplary embodiment of a transparent display device according to the present invention.

An exemplary embodiment of a transparent display device of FIG. 6 is similar to the exemplary embodiment of a transparent display device of FIG. 1 except for the fact that the color display layer 30 is driven as the passive matrix type and the color conversion layer 60 is driven as the active matrix type. The descriptions of FIG. 2A to FIG. 2F may also be applied to the transparent display device of FIG. 6. Furthermore, the screen of FIG. 3 may be displayed through the transparent display device shown in FIG. 6.

The second thin film element structure 20 includes the second electrode 121 as the transparent electrode with the stripe shape, and the first electrode 131 as the transparent electrode with the stripe shape is formed on the third substrate 40. Furthermore, the second thin film element structure 50 includes the second thin film transistor 140 and the fourth electrode 150.

Here, as in the exemplary embodiment discussed above, the second thin film element structure 50 may be formed on the second substrate 70. In such an alternative exemplary embodiment, the third electrode 160 is formed on the third substrate 40 and is disposed under the color conversion layer 60.

An exemplary embodiment of a manufacturing method of an exemplary embodiment of a transparent display device according to the present invention will now be described.

Firstly, in the present exemplary embodiment the first thin film element structure 20 including the second electrode 120 is formed on the first substrate 10, and a color display layer 30 including a cholesteric liquid crystal is formed on the first thin film element structure 20. Here, exemplary embodiments of the formation of the color display layer 30 may include the steps of forming a partition defining the cells and filling a cholesteric liquid crystal in each cell region.

Also, in the present exemplary embodiment the first electrode 130 is formed on the lower surface of the third substrate 40, the second thin film element structure 50 including the fourth electrode 150 is formed on the upper surface of the third substrate 40, and a color conversion layer 60 including an electrochromic organic or inorganic material or a reverse emulsion based on electrophoretic display is formed on the second thin film element structure 50. Here, the formation of the color conversion layer 60 may also include the steps of forming a partition defining the cells and filling the electrochromic material or the reverse emulsion based on electrophoretic display in each cell region.

In the present exemplary embodiment, the third electrode 160 is formed on the lower surface of the second substrate 70.

Alternative exemplary embodiments include configurations wherein the color display layer 30 may be formed on the lower surface of the first electrode 130 that is formed on the third substrate 40, and the color conversion layer 60 may be formed on the lower surface of the third electrode that is formed on the second substrate 70.

Next, the third substrate 40 is disposed on the color display layer 30 formed on the first substrate 10 to contact the first electrode 130 with the color display layer 30, and the first substrate 10 is combined with the third substrate 40. Next, the second substrate 70 is disposed on the color conversion layer 60 formed on the third substrate 40 to contact the third electrode with the color conversion layer 60, and the third substrate 40 and the second substrate 70 are assembled to each other.

The methods for forming the first and second thin film element structures 20 and 50 and the electrodes may be general methods for forming thin films such as thin film deposition and the patterning by photolithography. Alternative exemplary embodiments also include configurations wherein the thin film element structures 20 and 50 are formed to include first electrodes 131, second electrodes 121, third electrodes 161 and fourth electrodes 151.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising: a first substrate; a second substrate disposed substantially opposite to the first substrate; a third substrate disposed between the first substrate and the second substrate; a color display layer disposed between the first substrate and the third substrate, the color display layer comprising a cholesteric liquid crystal; a first electrode and a second electrode electrically connected to the color display layer; a color conversion layer disposed between the third substrate and the second substrate; and a third electrode and a fourth electrode electrically connected to the color conversion layer, wherein a thickness of the third substrate is less than or equal to about 20% of a width of the color display layer or a width of the color conversion layer in one pixel.

2. The display device of claim 1, further comprising:
a first thin film transistor disposed on the first substrate,
wherein the first thin film transistor is electrically connected to the second electrode.

3. The display device of claim 2, further comprising:
a second thin film transistor disposed on one of the second substrate and the third substrate,
wherein the second thin film transistor is electrically connected to the fourth electrode.

4. The display device of claim 2, wherein the third electrode and the fourth electrode have a stripe shape and are disposed substantially perpendicular to each other.

5. The display device of claim 1, wherein the first electrode and the second electrode have a stripe shape and are disposed substantially perpendicular to each other.

6. The display device of claim 5, further comprising:
a thin film transistor disposed on one of the second substrate and the third substrate,
wherein the thin film transistor is electrically connected to the fourth electrode.

7. The display device of claim 5, wherein the third electrode and the fourth electrode have a stripe shape and are disposed substantially perpendicular to each other.

8. The display device of claim 1, wherein the cholesteric liquid crystal is divided into a plurality of cells, and each of the cells comprises one color selected from the group consisting of red, green, blue, yellow, magenta, cyan, and white.

9. The display device of claim 8, wherein the color conversion layer is divided into a plurality of cells, and each of the cells comprises one color selected from the group consisting of an opaque black, a transparent non-chroma, and a semi-transparent ash.

10. The display device of claim 1, wherein the color conversion layer is divided into a plurality of cells, and each of the cells comprises one color selected from the group consisting of an opaque black, a transparent non-chroma, and a semi-transparent ash.

11. The display device of claim 1, wherein the color conversion layer comprises one of an electrochromic organic material, an electrochromic inorganic material, and a reverse emulsion based on an electrophoretic display.

12. The display device of claim 1, wherein the color conversion layer comprises a cell which displays an ash color gradation.

13. A method for manufacturing a display device, the method comprising: disposing a first thin film element structure including a second electrode on a first substrate; disposing a color display layer including a cholesteric liquid crystal on the first thin film element structure; disposing a first electrode under a third substrate; disposing a second thin film element structure including a fourth electrode on the third substrate; disposing a color conversion layer on the second thin film element structure; disposing a third electrode under a second substrate; combining the first substrate and the third substrate to contact the first electrode with the color display layer; and combining the third substrate and the second substrate to contact the third electrode with the color conversion layer, wherein a thickness of the third substrate is less than or equal to about 20% of a width of the color display layer or a width of the color conversion layer in one pixel.

14. The method of claim 13, wherein the disposing of the color display layer includes forming a partition to define a plurality of cells, and filling a cholesteric liquid crystal in the cells.

15. The method of claim 14, wherein the disposing of the color conversion layer includes forming a partition to define a plurality of cells, and filling one of an electrochromic organic material, an electrochromic inorganic material, and a reverse emulsion based on an electrophoretic display in the cells.

16. The method of claim 13, wherein the disposing of the color conversion layer includes forming a partition to define a plurality of cells, and filling one of an electrochromic organic material, an electrochromic inorganic material, and a reverse emulsion based on an electrophoretic display in the cells.

17. A method for manufacturing a display device, the method comprising: disposing a first thin film element structure including a second electrode on a first substrate; disposing a first electrode under a third substrate; disposing a color display layer including a cholesteric liquid crystal under the first electrode; disposing a second thin film element structure including a fourth electrode on the third substrate; disposing a third electrode under a second substrate; disposing a color conversion layer under the third electrode; combining the first substrate and the third substrate to contact the second electrode with the color display layer; and combining the third substrate and the second substrate to contact the fourth electrode with the color conversion layer, wherein a thickness of the third substrate is less than or equal to about 20% of a width of the color display layer or a width of the color conversion layer in one pixel.

18. The method of claim 17, wherein the disposing of the color display layer includes forming a partition to define a plurality of cells, and filling a cholesteric liquid crystal in the cells.

19. The method of claim 18, wherein the disposing of the color conversion layer includes forming a partition to define a plurality of cells, and filling one of an electrochromic organic material, an electrochromic inorganic material, and a reverse emulsion based on an electrophoretic display in the cells.

20. The method of claim 17, wherein the disposing of the color conversion layer includes forming a partition to define a plurality of cells, and filling one of an electrochromic organic material, an electrochromic inorganic material, and a reverse emulsion based on an electrophoretic display in the cells.

21. The method of claim 17, wherein the thickness of the third substrate is equal to or less than about 20% of the width of one of the color display layer and the color conversion layer in one pixel.

22. A display device comprising: a first substrate; a second substrate disposed substantially opposite to the first substrate; a third substrate disposed between the first substrate and the second substrate; a first electrode and a second electrode respectively disposed on the third substrate and the first substrate; a color display layer disposed between the first substrate and the third substrate, the color display layer comprising a cholesteric liquid crystal, the color display layer being controlled to be in one state selected from the group consisting of red, green, blue, yellow, magenta, cyan, white, and transparent by an electric field formed between the first electrode and the second electrode; a third electrode and a fourth electrode respectively disposed on the second substrate and the third substrate; and a color conversion layer disposed between the third substrate and the second substrate, the color conversion layer being controlled to convert to one of a transparent state and a black state by an electric field formed between the third electrode and the fourth electrode, wherein a thickness of the third substrate is less than or equal to about 20% of a width of the color display layer or a width of the color conversion layer in one pixel.

* * * * *